US012235871B2

(12) United States Patent
Subramanian et al.

(10) Patent No.: US 12,235,871 B2
(45) Date of Patent: Feb. 25, 2025

(54) SYSTEM AND METHOD FOR ASYNCHRONOUSLY TRANSFERRING REPLICATION DATA

(71) Applicant: Dell Products L.P., Round Rock, TX (US)

(72) Inventors: Vasudevan Subramanian, Chapel Hill, NC (US); Socheavy Heng, Cranston, RI (US); Nagapraveen Veeravenkata Seela, Cary, NC (US); Kosta Economou, Bradenton, FL (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/156,796

(22) Filed: Jan. 19, 2023

(65) Prior Publication Data
US 2024/0248910 A1 Jul. 25, 2024

(51) Int. Cl.
*G06F 16/27* (2019.01)
*G06F 11/14* (2006.01)

(52) U.S. Cl.
CPC ........ *G06F 16/273* (2019.01); *G06F 11/1469* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 8,112,661 | B1* | 2/2012 | La France | G06F 11/2069 714/42 |
| 8,452,700 | B2* | 5/2013 | Williams, III | G06Q 40/02 705/37 |
| 9,489,268 | B2* | 11/2016 | Babashetty | G06F 11/1464 |
| 11,070,645 | B1* | 7/2021 | Mercier | H04L 69/14 |
| 11,893,265 | B2* | 2/2024 | Nikoloudakis | G06F 3/0652 |
| 2007/0027787 | A1* | 2/2007 | Tripp | G06Q 40/06 705/36 R |
| 2007/0185933 | A1* | 8/2007 | Dao | G06F 3/0649 |
| 2010/0299244 | A1* | 11/2010 | Williams, III | G06Q 40/02 705/38 |
| 2012/0233419 | A1* | 9/2012 | Yamashita | G06F 11/1461 711/E12.103 |
| 2013/0339272 | A1* | 12/2013 | Willism, III | G06Q 40/06 705/36 R |
| 2014/0297588 | A1* | 10/2014 | Babashetty | G06F 11/3027 707/613 |
| 2016/0162371 | A1* | 6/2016 | Prabhu | G06F 16/176 707/654 |
| 2021/0042199 | A1* | 2/2021 | Migga-Vierke | H04L 63/0272 |
| 2021/0405881 | A1* | 12/2021 | Voecks | G06F 3/065 |
| 2023/0305733 | A1* | 9/2023 | Nikoloudakis | G06F 3/0652 |
| 2024/0160375 | A1* | 5/2024 | Nikoloudakis | G06F 3/067 |
| 2024/0248910 | A1* | 7/2024 | Subramanian | G06F 16/273 |

* cited by examiner

*Primary Examiner* — Kim T Nguyen
(74) *Attorney, Agent, or Firm* — Brian J. Colandreo; Heath M. Sargeant; Holland & Knight LLP

(57) ABSTRACT

A method, computer program product, and computing system for determining a recovery point object (RPO) value for a storage object. An amount of data to transfer from the storage object to a disaster recovery site is determined. A data replication transfer schedule for the storage object is generated based upon, at least in part, the RPO value and the amount of data to transfer. Data is asynchronously transferred from the storage object to the disaster recovery site using the data replication transfer schedule.

17 Claims, 7 Drawing Sheets

SYSTEM AND METHOD FOR ASYNCHRONOUSLY TRANSFERRING REPLICATION DATA

BACKGROUND

Storing and safeguarding electronic content may be beneficial in modern business and elsewhere. Accordingly, various methodologies may be employed to protect and distribute such electronic content.

For example, data services like asynchronous replication preserve data but have an impact on host input/output (IO) request latency. Asynchronous replication depends on refreshing snapshots and the snapshot creation and deletion associated with snapshot refresh has an impact. Additionally, further latency impacts are due to the steps involved in data transfer of the changes to a disaster recovery (DR) site and this includes the calculation of differences between two snapshots used for asynchronous replication and the transfer of the differences or deltas. In this manner, data services such as asynchronous replication compete for resources with host applications and impact host latency. Users generally need these additional data services on top of the host applications and while users understand that host latency will be impacted, the impact should be as minimal as possible.

SUMMARY OF DISCLOSURE

In one example implementation, a computer-implemented method executed on a computing device may include, but is not limited to, determining a recovery point object (RPO) value for a storage object. An amount of data to transfer from the storage object to a disaster recovery site is determined. A data replication transfer schedule for the storage object is generated based upon, at least in part, the RPO value and the amount of data to transfer. Data is asynchronously transferred from the storage object to the disaster recovery site using the data replication transfer schedule.

One or more of the following example features may be included. A priority may be determined of each storage object. Generating the data replication transfer schedule for the storage object may be further based upon, at least in part, the priority of each storage object. An asynchronous data transfer capacity may be determined for the storage object. Generating the data replication transfer schedule for the storage object may be further based upon, at least in part, the asynchronous data transfer capacity for the storage object. The RPO value and the amount of data to transfer from the storage object may be periodically re-determined. The data replication transfer schedule may be adjusted based upon, at least in part, a change in one or more of the RPO value and the amount of data to transfer from the storage object.

In another example implementation, a computer program product resides on a computer readable medium that has a plurality of instructions stored on it. When executed by a processor, the instructions cause the processor to perform operations that may include, but are not limited to, determining a recovery point object (RPO) value for a storage object. An amount of data to transfer from the storage object to a disaster recovery site is determined. A data replication transfer schedule for the storage object is generated based upon, at least in part, the RPO value and the amount of data to transfer. Data is asynchronously transferred from the storage object to the disaster recovery site using the data replication transfer schedule.

One or more of the following example features may be included. A priority may be determined of each storage object. Generating the data replication transfer schedule for the storage object may be further based upon, at least in part, the priority of each storage object. An asynchronous data transfer capacity may be determined for the storage object. Generating the data replication transfer schedule for the storage object may be further based upon, at least in part, the asynchronous data transfer capacity for the storage object. The RPO value and the amount of data to transfer from the storage object may be periodically re-determined. The data replication transfer schedule may be adjusted based upon, at least in part, a change in one or more of the RPO value and the amount of data to transfer from the storage object.

In another example implementation, a computing system includes at least one processor and at least one memory architecture coupled with the at least one processor, wherein the at least one processor configured to determine a recovery point object (RPO) value for a storage object. An amount of data to transfer from the storage object to a disaster recovery site is determined. A data replication transfer schedule for the storage object is generated based upon, at least in part, the RPO value and the amount of data to transfer. Data is asynchronously transferred from the storage object to the disaster recovery site using the data replication transfer schedule.

One or more of the following example features may be included. A priority may be determined of each storage object. Generating the data replication transfer schedule for the storage object may be further based upon, at least in part, the priority of each storage object. An asynchronous data transfer capacity may be determined for the storage object. Generating the data replication transfer schedule for the storage object may be further based upon, at least in part, the asynchronous data transfer capacity for the storage object. The RPO value and the amount of data to transfer from the storage object may be periodically re-determined. The data replication transfer schedule may be adjusted based upon, at least in part, a change in one or more of the RPO value and the amount of data to transfer from the storage object.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
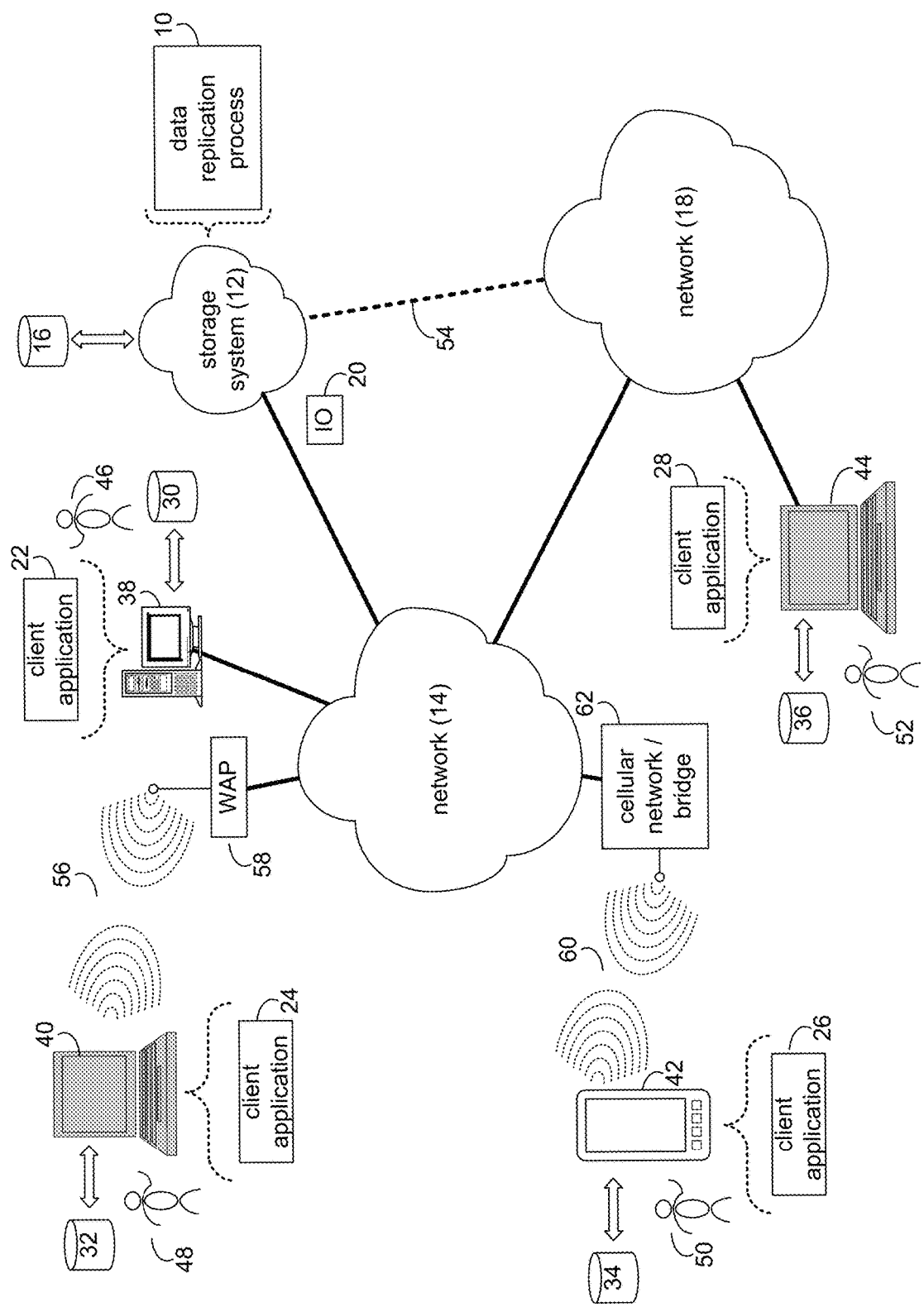
FIG. 1 is an example diagrammatic view of a storage system and a data replication process coupled to a distributed computing network according to one or more example implementations of the disclosure.

System Overview:

Referring to FIG. 1, there is shown data replication process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of data replication process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of data replication process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data replication process, such as data replication process 10 of FIG. 1, may include but is not limited to, determining a recovery point object (RPO) value for a storage object. An amount of data to transfer from the storage object to a disaster recovery site may be determined. A data replication transfer schedule for the storage object may be generated based upon, at least in part, the RPO value and the amount of data to transfer. Data may be asynchronously transferred from the storage object to the disaster recovery site using the data replication transfer schedule.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
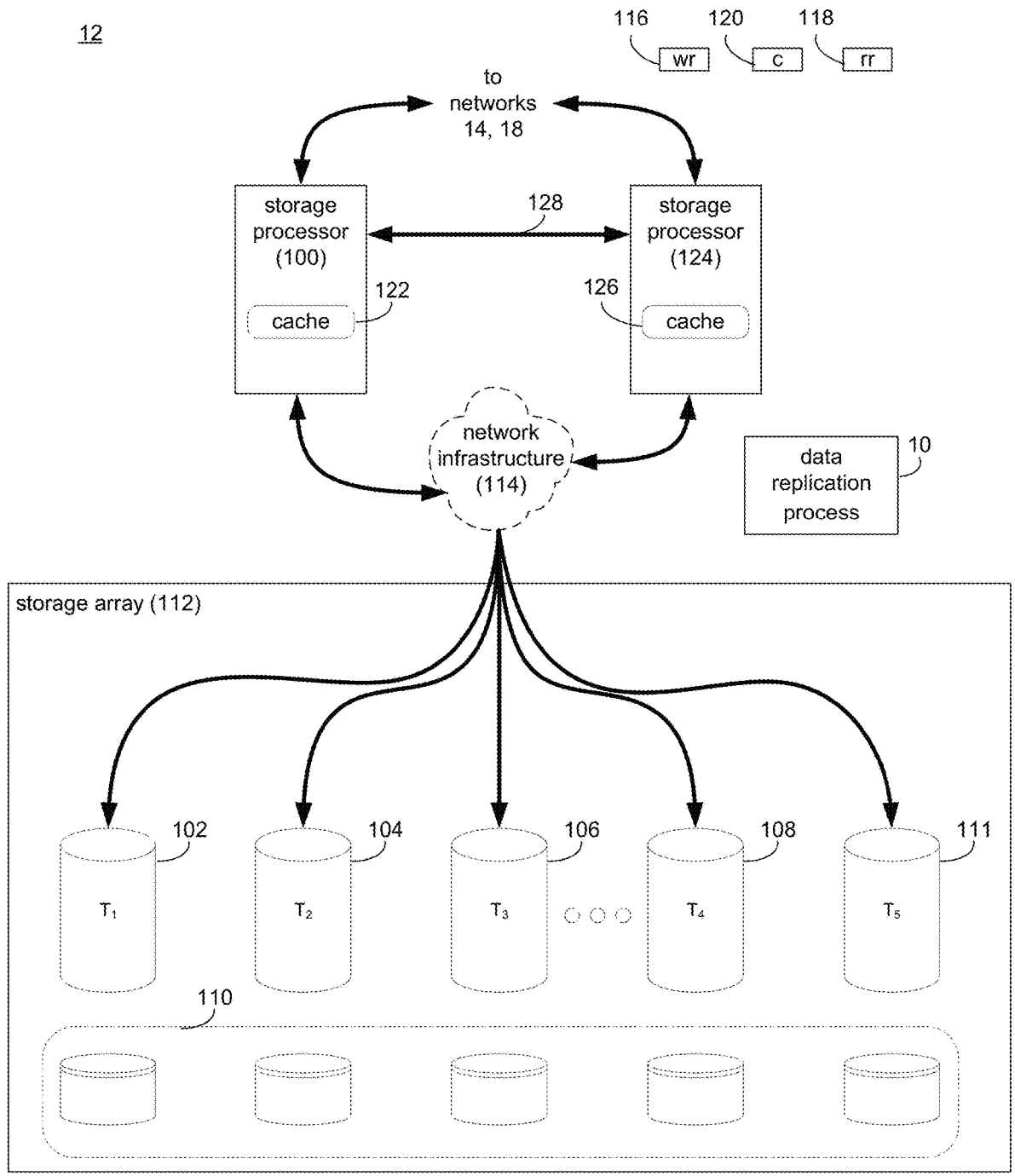
FIG. 2 is an example diagrammatic view of the storage system of FIG. 1 according to one or more example implementations of the disclosure.
Figure 3:
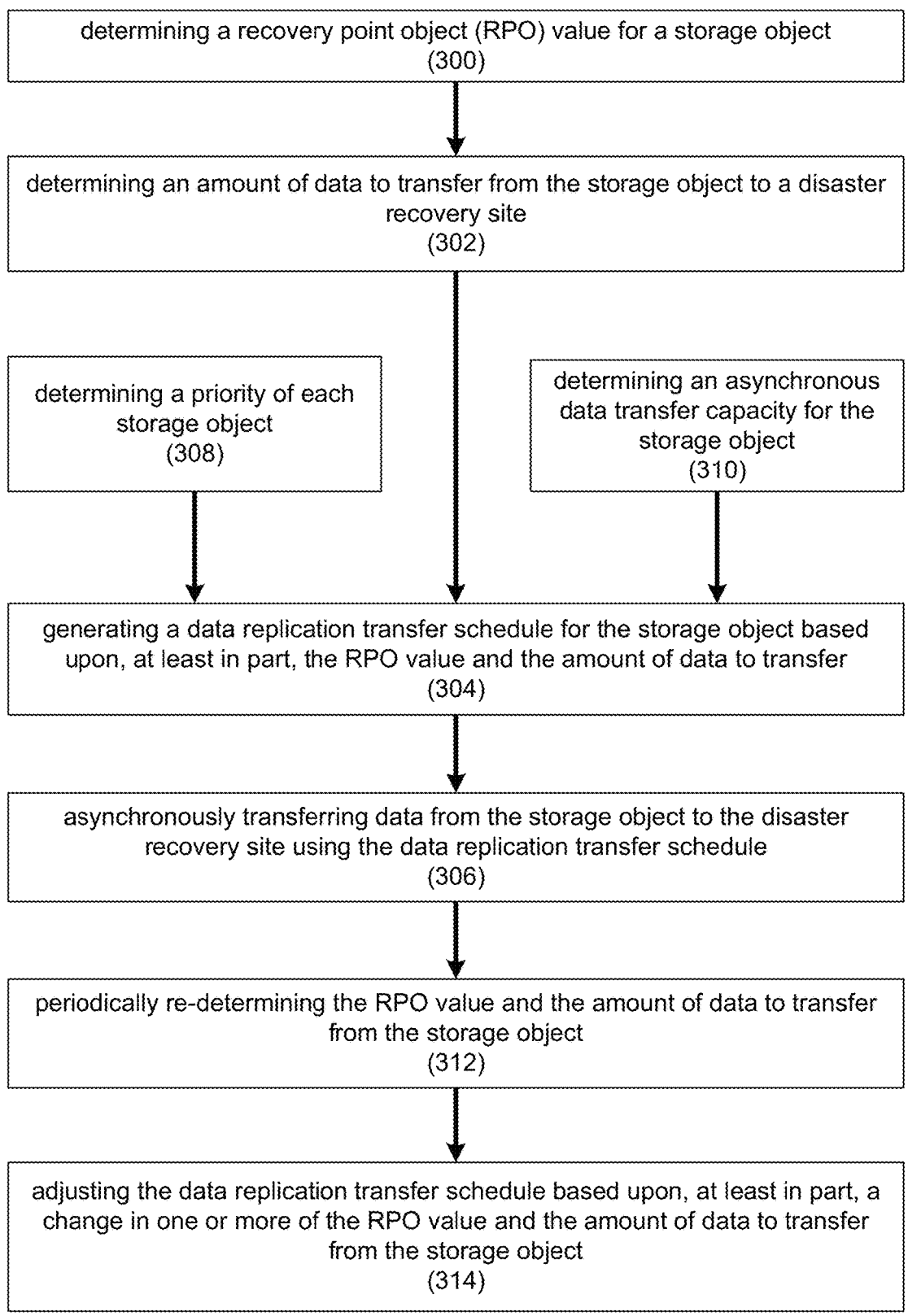
FIG. 3 is an example flowchart of data replication process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of data replication process 10. The instruction sets and subroutines of data replication process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of data replication process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of data replication process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of data replication process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Data Replication Process:

Referring also to the examples of FIGS. 3-7 and in some implementations, data replication process 10 may determine 300 a recovery point object (RPO) value for a storage object. An amount of data to transfer from the storage object to a disaster recovery site may be determined 302. A data replication transfer schedule for the storage object may be generated 304 based upon, at least in part, the RPO value and the amount of data to transfer. Data may be asynchronously transferred 306 from the storage object to the disaster recovery site using the data replication transfer schedule.

As will be discussed in greater detail below, implementations of the present disclosure may allow for the scheduling or pacing of replication data transfer in a RPO window such that the impact to host latency is as minimal as possible. For example and as discussed above, data services like asynchronous replication preserve data but have an impact on host input/output (IO) request latency. Asynchronous replication depends on refreshing snapshots and the snapshot creation and deletion associated with snapshot refresh has an impact. Additionally, further latency impacts are due to the steps involved in data transfer of the changes to a disaster recovery (DR) site and this includes the calculation of differences between two snapshots used for asynchronous replication and the transfer of the differences or deltas. In this manner, data services such as asynchronous replication compete for resources with host applications and impact host latency. Users generally need these additional data services on top of the host applications and while users understand that host latency will be impacted, the impact should be as minimal as possible. Accordingly, implementations of the present disclosure provide a dynamically adjustable data replication transfer schedule based upon, at least in part, an RPO value and the amount of data to transfer from a particular storage object to a disaster recovery site.

Figure 4:
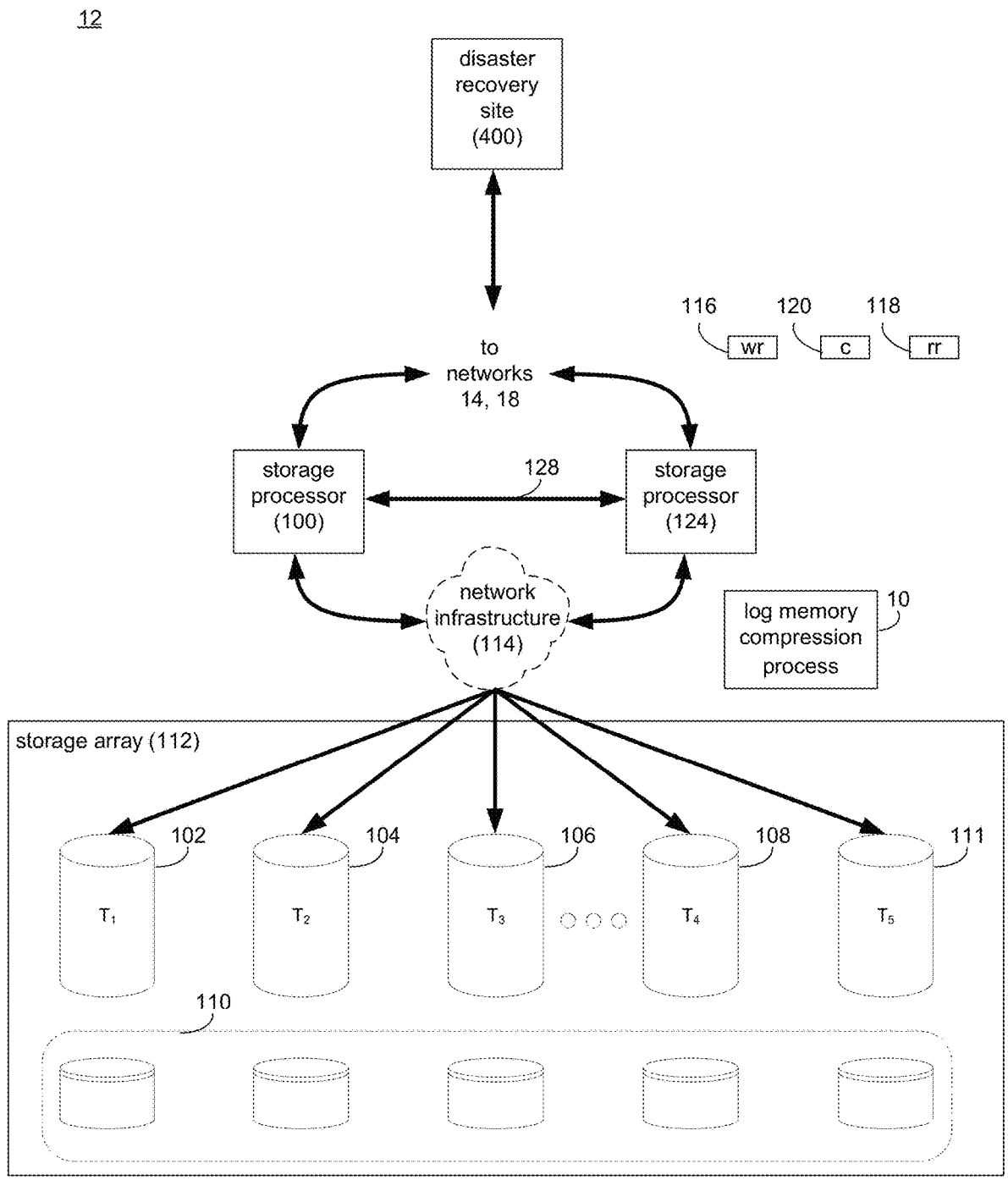
FIG. 4 is an example diagrammatic view of the storage system of FIG. 1 according to one or more example implementations of the disclosure.

Referring also to FIG. 4 and in some implementations, a storage system (e.g., storage system 12) may be communicatively coupled (e.g., via a network) to a disaster recovery (DR) site (e.g., disaster recovery site 400). Storage system 12 may be configured to asynchronously replicate data to disaster recovery site 400. For example, disaster recovery site 400 may maintain a disaster recovery version or copy of the data of storage system 12. In some implementations, storage system 12 may generate snapshots periodically and/or in response to receiving a threshold number of changes to particular storage objects. A storage object may generally include a volume, a file system, an object store bucket, a virtual volume (vVol), or any other container in memory for storing data. As disaster recovery site 400 may be geographically isolated or separated from storage system 12 such that data may recovered from disaster recovery site 400 during or after a disaster involving storage system 12. However, the process of replicating data from storage system 12 may be limited by the processing constraints associated with storage system 12, disaster recovery site 400, and/or the networking resources between storage system 12 and disaster recovery site 400. As discussed above, storage system 12 may balance resources between performing IO operations from a host device and asynchronously replicating data. As such, data replication process 10 may attempt to optimize the asynchronous replication of data by scheduling the data transfer to minimize latency issues for the host IO operations without compromising high availability of the data.

In some implementations, data replication process 10 determines 300 a recovery point object (RPO) value for a storage object. A recovery point object (RPO) generally includes the maximum amount of data that can be lost from a storage object on a disaster requiring recovery at a disaster recover (RD) site. Typically, the maximum amount of data is measured in units of time (e.g., seconds, minutes, hours, etc.). For example, suppose a user defines a RPO of e.g., 60 minutes for a particular storage object and there is a disaster on the production site (e.g., storage system 12) and recovery happens at time "t0". In this example, the user expects all data written after time (t0−60) minutes to be available on the disaster recovery site. In order to meet this RPO and using the example of RPO=60 minutes, asynchronous data replication is performed such that the replicated copy of the volume is created every 30 minutes and the other 30 minutes is used to transfer the data to the DR site.

In some implementations, the RPO value may be defined by a user (e.g., e.g., during creation of the storage object, during operation of the storage object, etc.), as a default value, and/or dynamically by data replication process 10. For example, a user may use a user interface to define the RPO value for a storage object. As discussed above, the RPO value may be a maximum amount of data that can be lost during a disaster recovery event measured in terms of time. In some implementations, a user may reconfigure the RPO value at any point in the operation of the storage object. The RPO value for each storage object may be maintained by the storage node as metadata within the storage object, in a database associated with the storage object, and/or in a separate storage object. Accordingly, data replication process 10 may determine 300 the RPO value for the storage object by processing each storage object and reading the RPO value and/or processing a database of RPO values. In some implementations, data replication process 10 may determine 300 the RPO value for each storage object periodically and/or in response to receiving a threshold of new data (e.g., via IO write requests) on a particular storage object.

Figure 5:
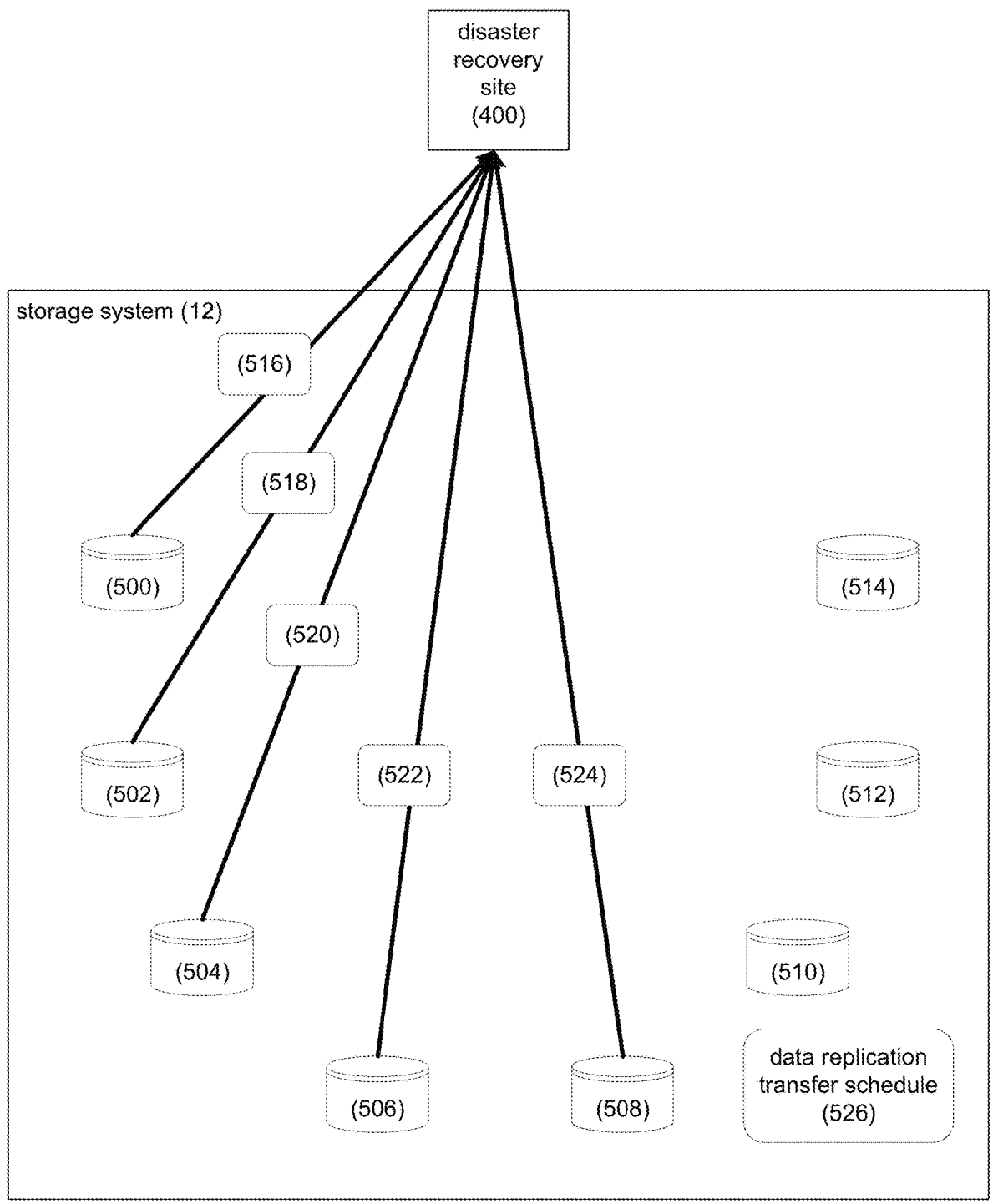
FIGS. 5-7 are example diagrammatic views of data replication process according to various example implementations of the disclosure.

Referring also to FIG. 5, suppose storage system 12 includes e.g., eight storage objects (e.g., storage objects 500, 502, 504, 506, 508, 510, 512, 514). In this example, each storage object may be replicated on disaster recovery site 400 by asynchronously replicating data from each storage object to disaster recovery site 400. In some implementations, storage system 12 may replicate data from the plurality of storage objects (e.g., storage objects 500, 502, 504, 506, 508, 510, 512, 514) to a plurality of disaster recovery sites (e.g., disaster recovery site 400). For this example, storage system 12 may replicate data from storage objects 500, 502, 504, 506, 508, 510, 512, 514 to a single disaster recovery site (e.g., disaster recovery site 400). However, it will be appreciated that data replication process 10 may replicate data to any number of disaster recovery sites within the scope of the present disclosure. Referring also to Table 1 below, data replication process 10 may determine 300 the RPO value for each storage object. For example and as shown in Row 3, data replication process 10 may determine 300 that storage object 500 has a RPO of e.g., five minutes; storage object 502 has a RPO of e.g., five minutes; storage object 504 has a RPO of e.g., 15 minutes; storage object 506 has a RPO of e.g., 30 minutes; storage object 508 has a RPO of e.g., 60 minutes; storage object 510 has a RPO of e.g., 360 minutes; storage object 512 has a RPO of e.g., 360 minutes; and storage object 514 has a RPO of e.g., 720 minutes.

In some implementations, data replication process 10 may determine a transfer time associated with the storage object based upon, at least in part, the RPO value for each storage object. For example, suppose that storage object 500 has an RPO value of e.g., five minutes. As discussed above, a five minute RPO value represents that maximum amount of data that can be lost during a disaster recovery event. Now suppose that the process of transferring the data from storage object 500 to disaster recovery site 400 requires a known or determinable amount of time. In this example, suppose that the amount of time required to transfer data from storage object 500 to disaster recovery site 400 is e.g., 50% of the RPO value. Accordingly, data replication process 10 may determine the transfer time for storage object 500 to be 2.5 minutes (e.g., 50% of five minutes). As shown in Row 5 of Table 1, data replication process 10 may determine the transfer time associated with each storage object based upon, at least in part, the RPO value for each storage object. In this example, data replication process 10 may determine a transfer time of 2.5 minutes for storage object 500 (e.g., 50% of five minutes); a transfer time of 2.5 minutes for storage object 502 (e.g., 50% of five minutes); a transfer time of 7.5 minutes for storage object 504 (e.g., 50% of 15 minutes); a transfer time of 15 minutes for storage object 506 (e.g., 50% of 30 minutes); a transfer time of 30 minutes for storage object 508 (e.g., 50% of 60 minutes); a transfer time of 180 minutes for storage object 510 (e.g., 50% of 360 minutes); a transfer time of 180 minutes for storage object 512 (e.g., 50% of 360 minutes); and a transfer time of 360 minutes for storage object 514 (e.g., 50% of 720 minutes).

TABLE 1

| 1 | Storage Object Name | (500) | (502) | (504) | (506) | (508) | (510) | (512) | (514) | Total Transfer (MB) |
|---|---|---|---|---|---|---|---|---|---|---|
| 2 | Replication Partner Site | (400) | (400) | (400) | (400) | (400) | (400) | (400) | (400) | |
| 3 | RPO (Mins.) | 5 | 5 | 15 | 30 | 60 | 360 | 360 | 720 | |
| 4 | Num. Missed RPO | 0 | 1 | 2 | 1 | 0 | 0 | 0 | 0 | |
| 5 | Transfer Time (50% of RPO) | 2.5 | 2.5 | 7.5 | 15 | 30 | 180 | 180 | 360 | |
| 6 | Approx. data to be transferred - | 500 | 1000 | 3000 | 3000 | 5000 | 10000 | 15000 | 20000 | |

TABLE 1-continued

| | | | | | | | | | |
|---|---|---|---|---|---|---|---|---|---|
| | calculated from metrics DB (MB) | | | | | | | | |
| 7 | Transfer Rate per minute based on Transfer Time (MB/minute) | 200 | 400 | 400 | 200 | 167 | 56 | 84 | 56 |
| 8 | Multiplicative factor to apply for prioritized transfers | 2 | 2 | 1.5 | 1.5 | 1 | 1 | 1 | 1 |
| 9 | Transfer in t0 (MB) | 400 | 800 | 600 | 300 | 200 | 0 | 0 | 0 | 2300 |
| 10 | Transfer in (t0 + 1) (MB) | 100 | 200 | 600 | 300 | 200 | 100 | 150 | 100 | 1750 |
| 11 | Transfer in (t0 + 2) | 0 | 0 | 600 | 300 | 200 | 100 | 150 | 100 | 1450 |

In some implementations, data replication process 10 determines 302 an amount of data to transfer from the storage object to a disaster recovery site. For example, data replication process 10 may track IO operations for a plurality of storage objects in predefined intervals (e.g., a five second interval). Data replication process 10 uses this information to determine 302 or estimate the amount of data transfer for a RPO period (e.g., amount of time defined by RPO value). In some implementations, data replication process 10 may determine 302 the amount of data to transfer for each storage object periodically and/or in response to receiving a threshold of new data (e.g., via IO write requests) on a particular storage object. In some implementations, data replication process 10 may query a database to determine the total write IO requests for a storage object in the period of RPO start time to RPO end time. In this manner, data replication process 10 may determine 302 the total amount of data to be transferred for that storage object during the RPO period. As will be discussed in greater detail below, knowing the total transfer for a storage object allows the algorithm to calculate the transfer rate (e.g., transfer rate per second).

Referring again to Table 1, data replication process 10 may determine 302 an amount of data to transfer from each storage object (e.g., storage object 500, 502, 504, 506, 508, 510, 512, 514) to disaster recovery site (e.g., disaster recovery site 400). For example, data replication process 10 may determine 302 that storage object 500 has e.g., 500 megabytes of data to transfer; storage object 502 has e.g., 1,000 megabytes of data to transfer; storage object 504 has e.g., 3,000 megabytes of data to transfer; storage object 506 has e.g., 3,000 megabytes of data to transfer; storage object 508 has e.g., 5,000 megabytes of data to transfer; storage object 510 has e.g., 10,000 megabytes of data to transfer; storage object 512 has e.g., 15,000 megabytes of data to transfer; and storage object 514 has e.g., 20,000 megabytes of data to transfer.

In some implementations, with the amount of data to transfer from the storage object to the disaster recovery site, data replication process 10 may access a past, average data transfer rate to each DR site. Accordingly, data replication process 10 may determine how long it will take to transfer the cumulative data transfers for all storage objects to a specific DR site. In one example, suppose data replication process 10 determines that the average network throughput between storage system 12 and disaster recover site 400 is 500 megabytes per second or 30,000 megabytes per minute. However, it will be appreciated that the average network throughput may be any value within the scope of the present disclosure.

In some implementations, data replication process 10 determines 308 a priority of each storage object. For example, a priority for each storage object may indicate the relative prioritization of a storage object relative to a plurality of storage objects when asynchronously transferring data to the disaster recovery site. In some implementations, the priority of each storage object may be defined by a user and/or by data replication process 10 using one or more rulesets indicating priority for each storage object based upon, at least in part, various properties or characteristics of the storage object. For example, data replication process 10 may prioritize particular storage objects based upon, at least in part, the amount of data transfer for a particular storage object for a RPO, the RPO duration, any past RPO misses (i.e., situations where the RPO value was not met by asynchronous data replication), use of multiple DR sites, etc. In some implementations and as will be discussed in greater detail below, data replication process 10 may represent the priority of each storage object as a multiplier value as shown in Table 1. For example, suppose that data replication process 10 determines that the RPO value for storage objects 500 and 502 is less than some threshold (e.g., less than five minutes) as shown in Row 3. In this example, data replication process 10 may prioritize storage objects 500 and 502 as shown in Row 8 with a two times multiplier value. Further, suppose that data replication process 10 determines that certain storage objects have missed their RPO value as shown in Row 4. Accordingly, data replication process 10 may assign or determine various priorities to storage objects 500, 502, 504, 506. In some implementations, data replication process 10 may apply a multiplier value of less than one to de-prioritize a storage object relative to other storage objects.

In some implementations, data replication process 10 determines 310 an asynchronous data transfer capacity for the storage object. An asynchronous data transfer capacity is the amount of transfer capacity allocated by the storage system for asynchronous data transfer. For example, a storage system may include a data path regulator configured to issue a number of tokens for allocating control or access to a data path (e.g., data path into and out of the storage system). In one example, the data path regulator may issue a number of tokens for the processing of each IO operation. These tokens may be returned or de-allocated when the IO operation processing is complete. In another example, tokens may be allocated for asynchronous data replication from a particular storage object to a disaster recovery site. These tokens may similarly be returned or de-allocated when the data replication is complete. In some implementations, data replication process 10 may determine 310 the asynchronous data transfer capacity for the storage object by querying (e.g., using an application programmable interface (API)) the data path regulator for a number of available tokens. With the available number of tokens, data replication process 10 may determine the asynchronous data transfer capacity. In some implementations, the asynchronous data transfer capacity may be representative of the total available asynchronous data transfer capacity for each storage object. In one example, data replication process 10 provides a query to the data path regulator and determines that the data path regulator will allow e.g., 100 megabytes per second or 6,000 megabytes per minute. As will be discussed in greater detail below, the asynchronous data transfer capacity may be defined for any number of storage objects (e.g., one storage object, a set of storage objects, all storage objects, etc.).

In some implementations, data replication process 10 generates 304 a data replication transfer schedule for the storage object based upon, at least in part, the RPO value and the amount of data to transfer. A data replication transfer schedule is a listing of how much data to asynchronously transfer per unit of time (e.g., per minute) for each storage object based upon, at least in part, the storage object's RPO. With each unit of time, the transfer rate may be adjusted by data replication process 10 to ensure that the complete transfer period allowed per the RPO value. Referring again to Row 7 of Table 1, data replication process 10 may determine the transfer rate based upon, at least in part, an amount of data to be transferred for a RPO window and the current rate of transfer. As shown in Row 7, data replication process 10 may determine the transfer rate for storage object 500 to be 200 megabytes per minute (e.g., 500 megabytes divided by 2.5 minutes for transfer); the transfer rate for storage object 502 to be 400 megabytes per minute (e.g., 1,000 megabytes divided by 2.5 minutes for transfer); the transfer rate for storage object 504 to be 400 megabytes per minute (e.g., 3,000 megabytes divided by 7.5 minutes for transfer); the transfer rate for storage object 506 to be 200 megabytes per minute (e.g., 3,000 megabytes divided by 15 minutes for transfer); the transfer rate for storage object 508 to be 167 megabytes per minute (e.g., 5,000 megabytes divided by 30 minutes for transfer); the transfer rate for storage object 510 to be 56 megabytes per minute (e.g., 10,000 megabytes divided by 180 minutes for transfer); the transfer rate for storage object 512 to be 84 megabytes per minute (e.g., 15,000 megabytes divided by 180 minutes for transfer); and the transfer rate for storage object 514 to be 56 megabytes per minute (e.g., 20,000 megabytes divided by 360 minutes for transfer).

In some implementations, data replication process 10 generates 304 the data replication transfer schedule for the storage object based upon, at least in part, the priority of each storage object. For example, data replication process 10 may include prioritization in the data replication transfer schedule by multiplying the transfer rate determined for each storage object by a priority-based multiplicative value. As shown in Row 8, storage objects 500, 502, 504, 506 may include a multiplicative value greater than "1" indicating a priority relative to storage objects 508, 510, 512, 514. In this manner, the data replication transfer schedule may allocate more of the asynchronous data transfer capacity to the higher priority storage objects. Referring to Rows 9-11 of Table 1, data replication process 10 may determine the transfer rate based upon, at least in part, an amount of data to be transferred for a RPO window and the current rate of transfer. As shown in Row 9, data replication process 10 may determine an amount of data (e.g., data 516) to transfer for storage object 500 in a first time interval (e.g., 400 megabytes starting at time t0, where 200 megabytes per minute multiplied by multiplicative factor of "2" equals 400 megabytes for minute to to t0+1); an amount of data (e.g., data 518) to transfer for storage object 502 in a first time interval (e.g., 800 megabytes starting at time t0, where 400 megabytes per minute multiplied by multiplicative factor of "2" equals 800 megabytes for minute t0 to t0+1); an amount of data (e.g., data 520) to transfer for storage object 504 in a first time interval (e.g., 600 megabytes starting at time t0, where 400 megabytes per minute multiplied by multiplicative factor of "1.5" equals 600 megabytes for minute t0 to t0+1); an amount of data (e.g., data 522) to transfer for storage object 506 in a first time interval (e.g., 300 megabytes starting at time t0, where 200 megabytes per minute multiplied by multiplicative factor of "1.5" equals 300 megabytes for minute t0 to t0+1); and an amount of data (e.g., data 524) to transfer for storage object 508 in a first time interval (e.g., 200 megabytes starting at time t0).

As shown in Row 9, the remaining, non-prioritized storage objects may be reduced or delayed during the first time interval given the increased RPO values. For example, as shown in Table 1, storage objects 508, 510, 512, 514 may have a reduced transfer rate during the first time interval because of the significantly longer RPO value than the RPO values of storage objects 500, 502, 504, 506.

Data replication process 10 may generate 304 the data replication transfer schedule for the storage object with a plurality of time intervals to account for all of the replication data to be transferred to the disaster recovery site. As shown in Rows 10-11 of Table 1, additional time intervals may be included in the data replication transfer schedule.

In some implementations, data replication process 10 generates 304 the data replication transfer schedule for the storage object based upon, at least in part, the asynchronous data transfer capacity for the storage object. For example, without the self-pacing data replication process 10 describes, the replication transfer engine would attempt to transfer 6,000 megabytes per minute if the data path regulator provided the needed tokens. However, with self-pacing imposed by data replication process 10, the amount of replication transfer data is reduced and spread over a period to provide better performance tradeoff with the host IO operation processing. In some implementations, data replication process 10 may generate 304 the data replication transfer schedule to balance the storage object transfer needs among all the non-prioritized storage objects while keeping the requests below the asynchronous data transfer capacity (i.e., the limit allowed by the data path regulator) without violating any of the RPO commitments for the storage objects. As shown in the last column of Table 1, for each time interval (e.g., Rows 9-11), data replication process 10 may keep the total transfer amount less than the asynchronous data replication transfer capacity (e.g., 6,000 megabytes per minute) by adjusting the amount of data transferred per storage object per time interval.

Figure 6:
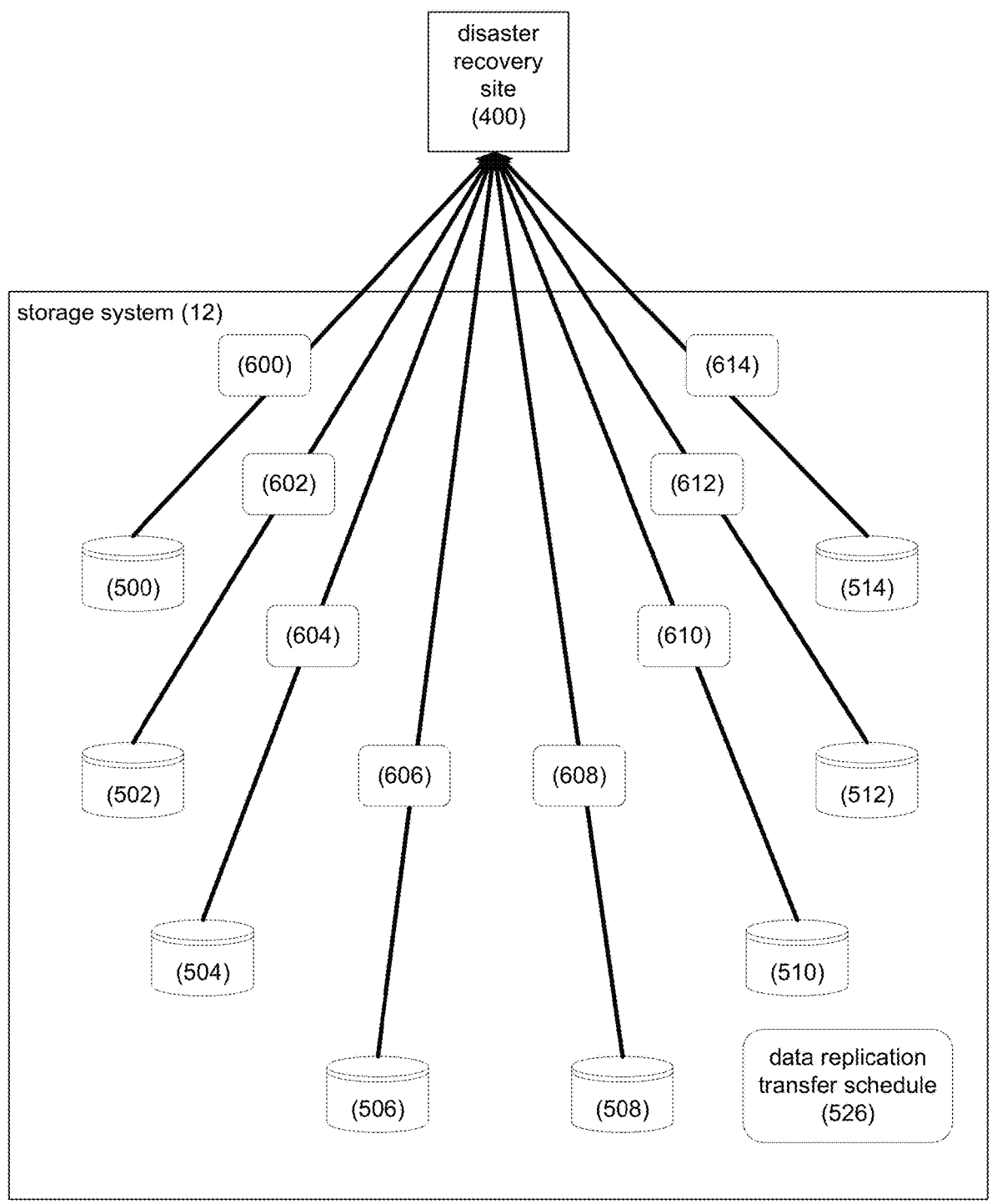
Figure 7:
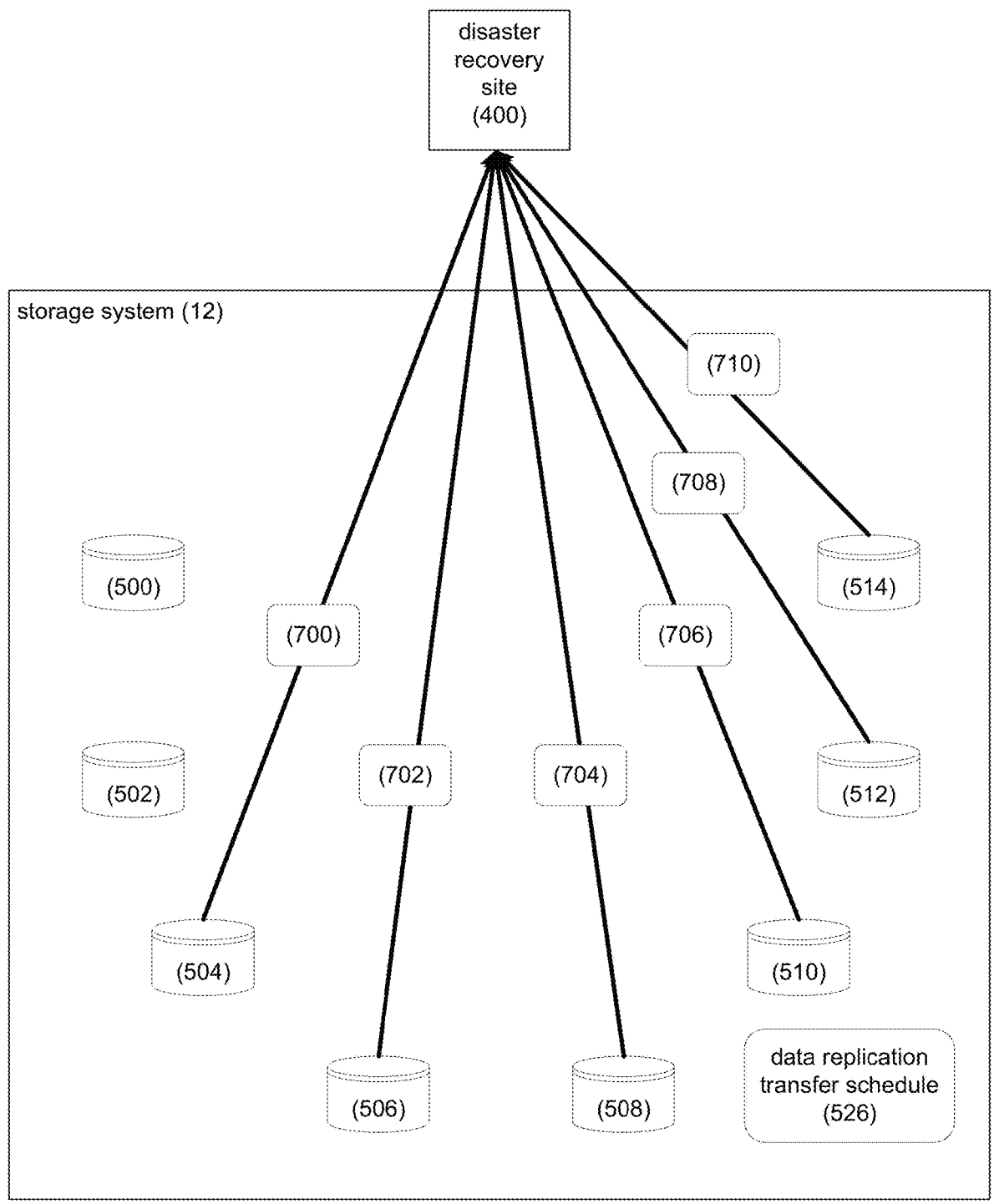

In some implementations, data replication process 10 asynchronously transfers 306 data from the storage object to the disaster recovery site using the data replication transfer schedule. For example, and as shown in FIG. 5, data replication process 10 may asynchronously transfer 306 data (e.g., data 500, 502, 504, 506, 508) from the storage object (e.g., storage objects 500, 502, 504, 506, 508) to the disaster recovery site (e.g., disaster recovery site 400) using the data replication transfer schedule (e.g., data replication transfer schedule 526). As shown in Row 9 of Table 1, at time interval t0–t0+1, data replication process 10 may asynchronously transfer 306 data (e.g., data 500, 502, 504, 506, 508) from the storage object (e.g., storage objects 500, 502, 504, 506, 508) to the disaster recovery site (e.g., disaster recovery site 400). As shown in FIG. 6 and Row 10 of Table 1, at time interval t0+1–t0+2, data replication process 10 may asynchronously transfer 306 data (e.g., data 600, 602, 604, 606, 608, 610, 612, 614) from the storage object (e.g., storage objects 500, 502, 504, 506, 508, 510, 512, 514) to the disaster recovery site (e.g., disaster recovery site 400). Finally, as shown in FIG. 7 and Row 11 of Table 1, at time interval t0+2–t0+3, data replication process 10 may asynchronously transfer 306 data (e.g., data 700, 702, 704, 706, 708, 710) from the storage object (e.g., storage objects 506, 508, 510, 512, 514) to the disaster recovery site (e.g., disaster recovery site 400). While FIGS. 5-7 include three time intervals, it will be appreciated that data replication process 10 may asynchronously transfer 306 data from the storage object to the disaster recovery site using the data replication transfer schedule including any number of time intervals within the scope of the present disclosure.

In some implementations, data replication process 10 periodically re-determines 312 the RPO value and the amount of data to transfer from the storage object. For example, data replication process 10 may determine 312 the RPO value and the amount of data to transfer from the storage object periodically (e.g., every "N" seconds). Accordingly, data replication process 10 may re-determine 312 the RPO value and the amount of data to transfer from the storage object after an additional N seconds. In some implementations, the periodicity between determination of the RPO value and the amount of data to transfer may be user-defined (e.g., using a user interface), may be a default value (e.g., every five seconds), or defined dynamically by data replication process 10. In some implementations, the periodicity between determinations of the RPO value and the amount of data to transfer may be determined based upon, at least in part, a threshold amount of data processed by storage system 12. For example, data replication process 10 may determine that a storage object has received at least a threshold amount of new data that needs to be replicated. Accordingly, data replication process 10 may re-determine 312 the RPO value and the amount of data to transfer.

In some implementations, data replication process 10 adjusts 314 the data replication transfer schedule based upon, at least in part, a change in one or more of the RPO value and the amount of data to transfer from the storage object. For example, data replication process 10 may determine that the RPO value and/or the amount of data to transfer has changed. In one example, data replication process 10 may adjust the data replication transfer schedule in response to determining that at least a threshold amount of data has changed. In another example, data replication process 10 may adjust 314 the data replication transfer schedule in response to any changes or the lack thereof in the RPO value and/or amount of data to transfer.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    determining a recovery point object (RPO) value for a storage object;
    determining an amount of data to transfer from the storage object to a disaster recovery site;
    determining a transfer rate based upon, at least in part, the amount of data to transfer from the storage object to the disaster recovery site and a current rate of transfer;
    determining a priority of each storage object of a plurality of storage objects;
    generating a data replication transfer schedule for the storage object based upon, at least in part, the RPO value and the amount of data to transfer includes prioritization in the data replication transfer schedule by multiplying the transfer rate determined for each storage object by a priority-based multiplicative value, wherein applying the priority-based multiplicative value of greater than one prioritizes the storage object relative to other storage objects of the plurality of storage objects, and wherein applying the priority-based multiplicative value of less than one de-prioritizes the storage object relative to the other storage objects of the plurality of storage objects; and
    asynchronously transferring data from the storage object to the disaster recovery site using the data replication transfer schedule.

2. The computer-implemented method of claim 1, wherein generating the data replication transfer schedule for the storage object is further based upon, at least in part, the priority of each storage object of the plurality of storage objects.

3. The computer-implemented method of claim 1, further comprising:
    determining an asynchronous data transfer capacity for the storage object.

4. The computer-implemented method of claim 3, wherein generating the data replication transfer schedule for the storage object is further based upon, at least in part, the asynchronous data transfer capacity for the storage object.

5. The computer-implemented method of claim 1, further comprising:
    periodically re-determining the RPO value and the amount of data to transfer from the storage object.

6. The computer-implemented method of claim 5, further comprising:
    adjusting the data replication transfer schedule based upon, at least in part, a change in one or more of the RPO value and the amount of data to transfer from the storage object.

7. A computer program product residing on a non-transitory computer readable medium having a plurality of instructions stored thereon which, when executed by a processor, cause the processor to perform operations comprising:
    determining a recovery point object (RPO) value for a storage object;
    determining an amount of data to transfer from the storage object to a disaster recovery site;
    determining a transfer rate based upon, at least in part, the amount of data to transfer from the storage object to the disaster recovery site and a current rate of transfer;

determining a priority of each storage object of a plurality of storage objects;

generating a data replication transfer schedule for the storage object based upon, at least in part, the RPO value and the amount of data to transfer includes prioritization in the data replication transfer schedule by multiplying the transfer rate determined for each storage object by a priority-based multiplicative value, wherein applying the priority-based multiplicative value of greater than one prioritizes the storage object relative to other storage objects of the plurality of storage objects, and wherein applying the priority-based multiplicative value of less than one de-prioritizes the storage object relative to the other storage objects of the plurality of storage objects; and asynchronously transferring data from the storage object to the disaster recovery site using the data replication transfer schedule.

8. The computer program product of claim 7, wherein generating the data replication transfer schedule for the storage object is further based upon, at least in part, the priority of each storage object of the plurality of storage objects.

9. The computer program product of claim 7, wherein the operations further comprise:

determining an asynchronous data transfer capacity for the storage object.

10. The computer program product of claim 9, wherein generating the data replication transfer schedule for the storage object is further based upon, at least in part, the asynchronous data transfer capacity for the storage object.

11. The computer program product of claim 7, wherein the operations further comprise:

periodically re-determining the RPO value and the amount of data to transfer from the storage object.

12. The computer program product of claim 11, wherein the operations further comprise:

adjusting the data replication transfer schedule based upon, at least in part, a change in one or more of the RPO value and the amount of data to transfer from the storage object.

13. A computing system comprising:

a memory; and a processor configured to determining a recovery point object (RPO) value for a storage object, wherein the processor is further configured to determine an amount of data to transfer from the storage object to a disaster recovery site, wherein the processor is further configured to determine a transfer rate based upon, at least in part, the amount of data to transfer from the storage object to the disaster recovery site and a current rate of transfer, wherein the processor is further configured to determine a priority of each storage object of a plurality of storage objects, wherein the processor is further configured to generate a data replication transfer schedule for the storage object based upon, at least in part, the RPO value and the amount of data to transfer includes prioritization in the data replication transfer schedule by multiplying the transfer rate determined for each storage object by a priority-based multiplicative value, wherein the processor is further configured to apply the priority-based multiplicative value of greater than one prioritizes the storage object relative to other storage objects of the plurality of storage objects, wherein the processor is further configured to apply the priority-based multiplicative value of less than one de-prioritizes the storage object relative to the other storage objects of the plurality of storage objects, and wherein the processor is further configured to asynchronously transfer data from the storage object to the disaster recovery site using the data replication transfer schedule.

14. The computing system of claim 13, wherein generating the data replication transfer schedule for the storage object is further based upon, at least in part, the priority of each storage object of the plurality of storage objects.

15. The computing system of claim 13, wherein the processor is further configured to:

determine an asynchronous data transfer capacity for the storage object.

16. The computing system of claim 15, wherein generating the data replication transfer schedule for the storage object is further based upon, at least in part, the asynchronous data transfer capacity for the storage object.

17. The computing system of claim 13, wherein the processor is further configured to:

periodically re-determine the RPO value and the amount of data to transfer from the storage object.

* * * * *